(12) United States Patent
  Ahmad

(10) Patent No.: US 9,388,777 B2
(45) Date of Patent: Jul. 12, 2016

(54) KIDNEY LOOP FILTRATION SYSTEM FOR FUEL DELIVERY SYSTEM

(71) Applicant: Caterpillar Inc., Peoria, IL (US)

(72) Inventor: Chad F. Ahmad, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 327 days.

(21) Appl. No.: 14/199,125

(22) Filed: Mar. 6, 2014

(65) Prior Publication Data

US 2014/0183112 A1  Jul. 3, 2014

(51) Int. Cl.
*F02M 37/22* (2006.01)
*F02M 37/00* (2006.01)
*B01D 35/147* (2006.01)

(52) U.S. Cl.
CPC ....... *F02M 37/0047* (2013.01); *F02M 37/0023* (2013.01); *F02M 37/22* (2013.01); *B01D 35/147* (2013.01)

(58) Field of Classification Search
None
See application file for complete search history.

(56) References Cited

U.S. PATENT DOCUMENTS 4,543,938 A * 10/1985 Szlaga ............... F02M 37/0023
                                                               123/514

FOREIGN PATENT DOCUMENTS

DE   102011053303        3/2012
FR   EP 0819458 A1  *  1/1998  .......... B01D 35/147

* cited by examiner

*Primary Examiner* — Terry Cecil

(57) ABSTRACT

A fuel delivery system is described in the present disclosure. The fuel delivery system includes a kidney loop filtration system for filtering fuel stored in a tank. The kidney loop filtration system is fluidly connected to the tank and to a fuel transfer pump. The kidney loop filtration system includes a pump, at least one primary filter, and a swing-check valve. The swing-check valve allows flow of fuel in a first direction in a first mode of operation and in a second direction in a second mode of operation. The swing-check valve further includes a flow passage and a perforated flap. The perforated flap filters fuel during the flow of fuel, in the second direction.

1 Claim, 4 Drawing Sheets

KIDNEY LOOP FILTRATION SYSTEM FOR FUEL DELIVERY SYSTEM

TECHNICAL FIELD

The present disclosure relates generally to a fuel delivery system. More specifically, the present disclosure relates to a kidney loop filtration system for the fuel delivery system.

BACKGROUND

Fuel delivery systems are generally configured to transfer fuel from a tank to an engine of a vehicle. A typical fuel delivery system may comprise the tank, a fuel transfer pump, and at least one fuel injector, which may work together to deliver the fuel to the engine of the vehicle. Further, the fuel stored in the tank may contain impurities/contaminants, which if not filtered out, may damage the components of the fuel delivery system. Therefore, at least one filter may be positioned between the tank and the fuel transfer pump, to filter the fuel. After filtering the fuel, the at least one filter may deliver the fuel to the fuel transfer pump. Further, the fuel delivery system may also include a bypass line. The bypass line may re-circulate the additional fuel within the fuel delivery system.

In certain situations, with a malfunction within the fuel delivery system such as, but not limited to, the at least one filter may be blocked, the bypass line may also be used to transfer fuel from the tank to the fuel transfer pump. The bypass line thus, enables the engine of the vehicle to operate despite one or more of above mentioned situations. However, during the transfer of fuel via bypass line, the fuel is not filtered. This leads to a condition in which the engine of the vehicle may receive fuel with impurities/contaminants. This may cause poor combustion of fuel and may damage various components of the engine and/or the fuel delivery system.

The exemplary embodiments of the present disclosure are directed to overcome deficiencies described above.

SUMMARY OF THE DISCLOSURE

One aspect of the present disclosure is directed to a kidney loop filtration system for a fuel delivery system of an internal combustion engine. The kidney loop filtration system is configured to provide fuel from a tank to the fuel transfer pump. The kidney loop filtration system includes a pump, at least one primary filter, a bypass channel, and a swing-check valve. The swing-check valve further includes a flow passage and a perforated flap. The at least one primary filter may be positioned downstream of the pump. The bypass channel may connect the delivery side of the at least one primary filter to the suction side of the pump. The swing-check valve may be positioned in the bypass channel. The perforated flap may be pivotally mounted in the flow passage of the swing-check valve and configured to swing between a first position and a second position. The perforated flap may be further configured to filter the fuel when in the second position. Further the fuel flows through the bypass channel in a first direction in a first mode of operation and in a second direction in a second mode of operation.

DETAILED DESCRIPTION

Figure 1:
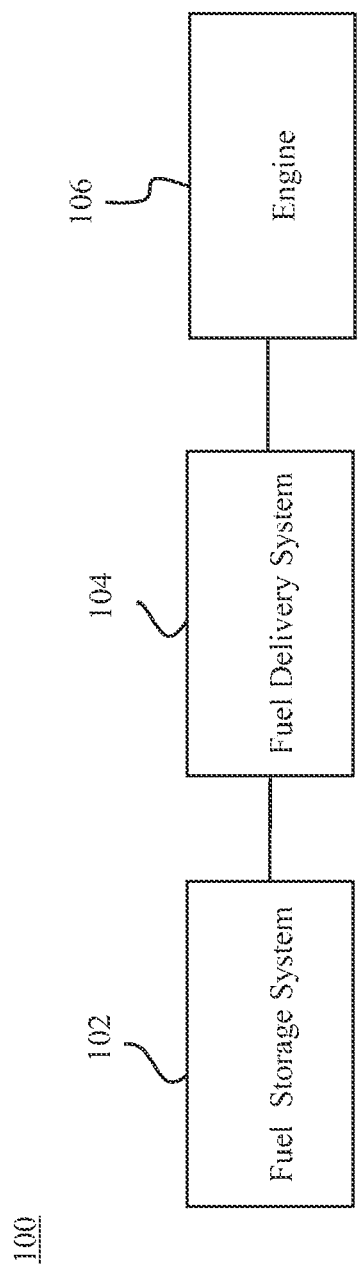
FIG. 1 illustrates a block diagram of a fuel management system of a vehicle, in accordance with the concepts of the present disclosure.

FIG. 1 illustrates a block diagram of a fuel management system 100 of a vehicle, in accordance with the concepts of the present disclosure. The fuel management system 100 may comprise a fuel storage system 102, a fuel delivery system 104, and an engine 106. The fuel storage system 102 holds, pumps, and delivers fuel to the fuel delivery system 104. The fuel delivery system 104 injects fuel in the engine 106. The engine 106 burns the fuel injected by the fuel delivery system 104, to generate power required to run the vehicle. The fuel may contain impurities/contaminants, which may cause improper burning of the fuel in the engine 106. Therefore, before the fuel is delivered to the engine 106, the fuel is filtered by the fuel delivery system 104.

Figure 2:
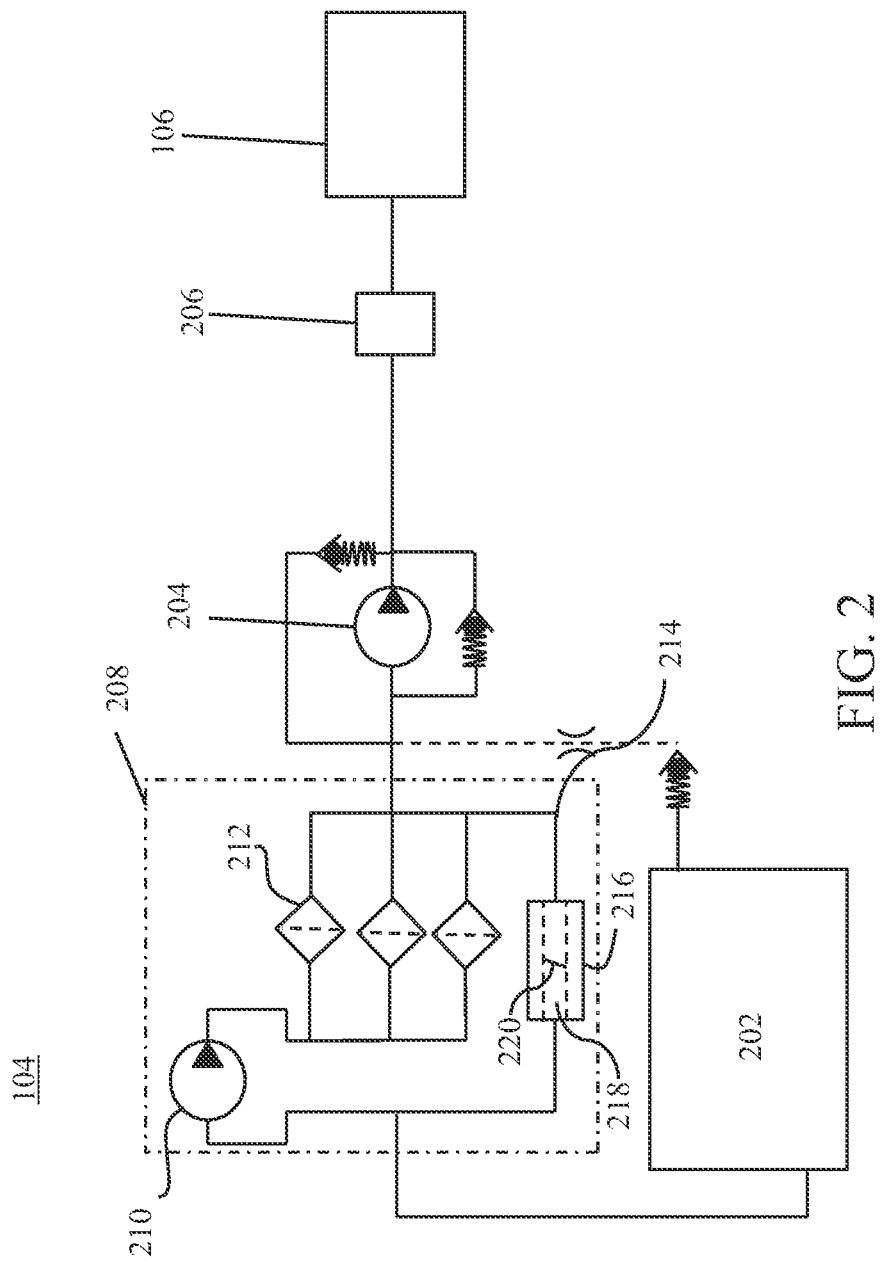
FIG. 2 illustrates an exemplary hydraulic circuit diagram of a fuel delivery system, in accordance with the concepts of the present disclosure.

FIG. 2 illustrates an exemplary hydraulic circuit diagram of the fuel delivery system 104, in accordance with the concepts of the present disclosure. The fuel delivery system 104 includes various components and systems that may cooperate to transfer fuel to the engine 106. The fuel delivery system 104 includes a tank 202, a fuel transfer pump 204, at least one fuel injector 206 and a kidney loop filtration system 208. The kidney loop filtration system 208 further includes a pump 210, at least one primary filter 212, a bypass channel 214 and a swing-check valve 216. The swing-check valve 216 further includes a flow passage 218 and a perforated flap 220.

The tank 202 of the fuel delivery system 104 is configured to hold and store fuel which may contain impurities/contaminants. The fuel transfer pump 204 is configured to supply fuel from the tank 202 and deliver the fuel to the at least one fuel injector 206. The fuel transfer pump 204 may also supply and deliver the impurities/contaminants present, along with the fuel. This may cause damage to the downstream components of the fuel management system 100. In such situations, an additional system is required to filter the fuel initially. Therefore, the fuel stored in the tank 202 is passed through the kidney loop filtration system 208 before the fuel transfer pump 204 for an initial filtration of fuel. The kidney loop filtration system 208 is configured to provide a high level of filtration in the fuel delivery system 104 and further configured to transfer fuel from the tank 202 to the fuel transfer pump 204.

The kidney loop filtration system 208 is configured to filter the fuel by continuously circulating the fuel in a closed-loop manner. Although, the present disclosure is explained with reference to the kidney loop filtration system 208 for filtration of fuel, it is understood to a person ordinarily skilled in the art that the kidney loop filtration system 208 may be used to filter any fluid, such as Diesel Exhaust Fluid (DEF), water, coolant, lubricant, and/or the like. The kidney loop filtration system 208 includes the pump 210, the at least one primary filter 212, the bypass channel 214, and the swing-check valve 216. The kidney loop filtration system 208 is in fluid communication with the tank 202. The tank 202 is positioned upstream to the kidney loop filtration system 208. The kidney loop filtration system 208 is also in fluid communication with the fuel transfer pump 204. The fuel transfer pump 204 is positioned downstream to the kidney loop filtration system 208. The above discussed fluid communication of the kidney loop filtration system 208 enables the flow of fuel from the tank 202 to the fuel transfer pump 204. The kidney loop filtration system 208 is further configured to work in a first mode of operation and a second mode of operation depending on the operational condition of the fuel delivery system 104.

The pump 210 is configured to pump fuel from the tank 202 and circulate fuel in the kidney loop filtration system 208 continuously. In an illustrated embodiment, the pump 210 is capable of pumping fuel within the kidney loop filtration system 208 in a clockwise as well as counter-clockwise direction. The pump 210 may further be configured to direct and supply fuel to at least one primary filter 212. The at least one primary filter 212 is positioned downstream of the pump 210 and configured to filter the fuel, which has been continuously supplied by the pump 210. In an embodiment, the at least one primary filter 212 includes multiple parallel filter elements positioned in series with the pump 210. This enables the fuel to flow in the same direction through the pump 210 and the at least one primary filter 212.

Fuel passes through the at least one primary filter 212, removing impurities/contaminants. A part of filtered fuel is then supplied to the fuel transfer pump 204. The fuel transfer pump 204 supplies part of fuel to the at least one fuel injector 206. The at least one fuel injector 206 further injects the fuel into the engine 106. This enables the engine 106 to operate. Remaining fuel is then supplied to the bypass channel 214. The bypass channel 214 connects the delivery side of the at least one primary filter 212 to the suction side of the pump 210. This enables the remaining fuel to re-circulate through the kidney loop filtration system 208 in the closed-loop manner. In an embodiment, the fuel flows in a first direction through the bypass channel 214 in the first mode of operation and in a second direction through the bypass channel 214 in the second mode of operation. The first direction is the direction when the fuel flows from the pump 210 to the at least one primary filter 212 and then through the bypass channel 214 via the swing-check valve 216. The second direction is the direction when the fuel flow bypasses the pump 210 and the at least one primary filter 212 and flows directly through the bypass channel 214 via the swing-check valve 216 to the fuel transfer pump 204.

The swing-check valve 216 is positioned in the bypass channel 214 and is in fluid communication with the pump 210 and the at least one primary filter 212. In an embodiment, the swing-check valve 216 is positioned in parallel with the pump 210 and the at least one primary filter 212. This enables the fuel to flow through the swing-check valve 216 in opposite direction to that of the pump 210 and the at least one primary filter 212.

The swing-check valve 216 further includes the flow passage 218 and the perforated flap 220. The flow passage 218 is configured to allow the flow of fuel through the swing-check valve 216. The perforated flap 220 is pivotally mounted in the flow passage 218. The perforated flap 220 is configured to swing between a first position and a second position depending on the direction of the flow of fuel.

Figure 3:
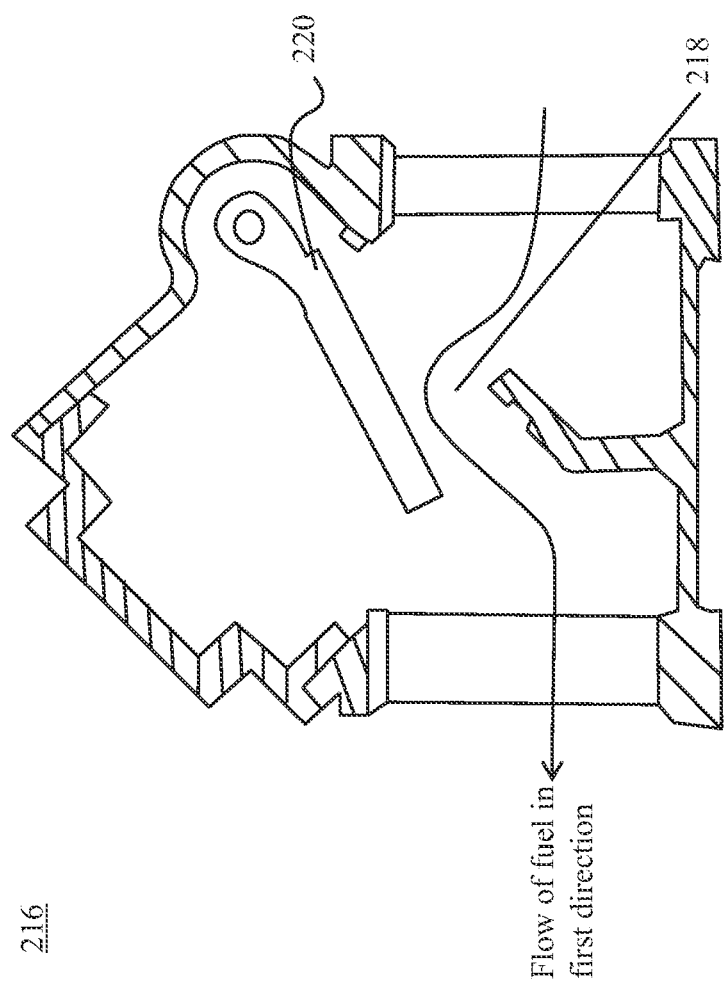
FIG. 3 illustrates a sectional view of an exemplary swing-check valve in first mode of operation, in accordance with the concepts of the present disclosure.

FIG. 3 illustrates a sectional view of the swing-check valve 216 in the first mode of operation, in accordance with the concepts of the present disclosure. In the first mode of operation, the fuel flow in the first direction through the swing-check valve 216. This causes the perforated flap 220 to swing in the first position. The perforated flap 220 swings in the first position due to the pressure of the fuel flow acting on the perforated flap 220. This allows the free flow of fuel without filtering the fuel through the swing-check valve 216.

Figure 4:
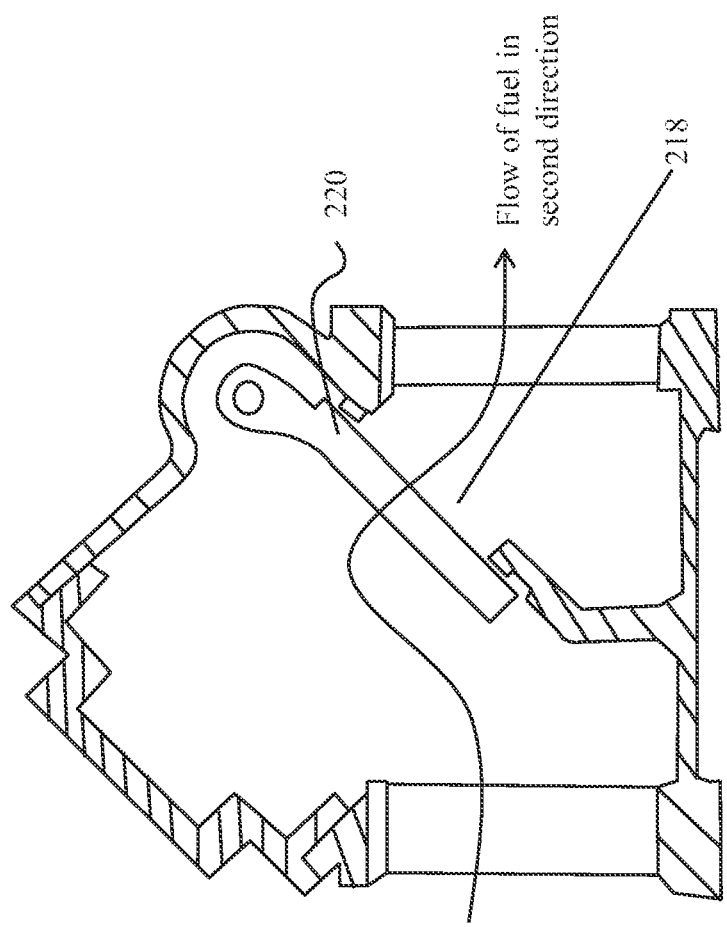
FIG. 4 illustrates a sectional view of the exemplary swing-check valve in second mode of operation, in accordance with the concepts of the present disclosure.

FIG. 4 illustrates a sectional view of the swing-check valve 216 in the second mode of operation, in accordance with the concepts of the present disclosure. In the second mode of operation, the perforated flap 220 remains in the second position to allow the fuel to flow through the perforated flap 220. The perforated flap filters the fuel as the fuel flows through the perforated flap 220. In an embodiment, the perforated flap has a mesh like structure to filter the fuel. However, it is evident to a person with ordinary skills in the art that the perforated flap 220 can have structure known in the art capable of filtering fluid. Thereby the swing-check valve 216 filters the fuel when the fuel flow through the swing-check valve 216 in the second direction.

In certain situations, such as, but not limited to, failure of the pump 210 and/or fouling of the at least one primary filter 212, the fuel may not be able to flow in the first direction. This may lead to an interruption in the supply of fuel to the fuel transfer pump 204. In order to have a continuous supply of fuel to the fuel transfer pump 204 the fuel may flow in the second direction. This leads to a situation when the fuel flow bypasses the pump 210 and the at least one primary filter 212. Further, the fuel flow directly passes through the swing-check valve 216, to the fuel transfer pump 204. As discussed above in the disclosure, during the flow of fuel in second direction the perforated flap 220 is closed. This provides the required filtration to the fuel, screening the impurities and contaminants.

INDUSTRIAL APPLICABILITY

The fuel delivery system 104 of the present disclosure has an application in a variety of engines, which may include diesel engines, gasoline engines, gaseous-fuel powered engines, and/or the like. The fuel delivery system 104 may transfer fuel from the tank 202 to the engine 106, after filtration. In the first mode of operation, the fuel transfer pump 204 pumps fuel from the tank 202 via the kidney loop filtration system 208. The kidney loop filtration system 208 filters the fuel pumped from the tank 202. In the first mode of operation fuel circulates in the kidney loop filtration system 208 in the first direction. When the flow is in the first direction, the fuel passes through pump 210, then via the at least one primary filter 212 to perform filtration. After filtration, a part of the fuel is supplied to the fuel transfer pump 204 and the remaining fuel is re-circulated within the kidney loop filtration system 208, through the bypass channel 214 via swing-check valve 216. The perforated flap 220 of the swing-check valve 216 is open during the flow in the first direction, thus allowing a free flow of fuel.

In the second mode of operation fuel flows in the second direction. The second mode of operation for the fuel delivery system 104 may be initiated manually or automatically by a controller depending on the operating conditions of the fuel delivery system 104. The operating condition in which the second mode of operations is initiated are such as but not limited to replacement/repairing of the pump 210 and/or the at least one primary filter 212. In second direction of fuel flow, the fuel directly passes through the bypass channel 214 via swing-check valve 216. This enables a continuous flow of fuel in all the situations. The fuel flow bypasses the pump 210 and the at least one primary filter 212. The perforated flap 220 of the swing-check valve 216 is closed during the flow in the second direction. This enables the filtration of fuel during the flow in the second direction as well. Therefore, the current disclosure provides the fuel delivery system 104 with the kidney loop filtration system 208. The fuel delivery system 104 enables the filtration of fuel in both the direction of fuel flow. Hence, providing engine 106 with a fuel free from impurities/contaminants. This leads to an efficient working of the engine 106 and increased life cycle of the components present downstream of the kidney loop filtration system 208.

What is claimed is:

1. A kidney loop filtration system for a fuel delivery system of an internal combustion engine, the kidney loop filtration system configured to provide fuel from a tank to a fuel delivery system, the kidney loop filtration system comprising:
   a pump;
   at least one primary filter positioned downstream of the pump;
   a bypass channel connecting the delivery side of the at least one primary filter to the suction side of the pump;
   a swing-check valve positioned in the bypass channel, the swing-check valve comprising:
   a flow passage; and
   a perforated flap pivotally mounted in the flow passage, wherein the perforated flap is configured to swing between a first position and a second position and filters the fuel when in the second position; and
   wherein the fuel flows through the bypass channel in a first direction in a first mode of operation and in a second direction in a second mode of operation.

* * * * *